UNITED STATES PATENT OFFICE.

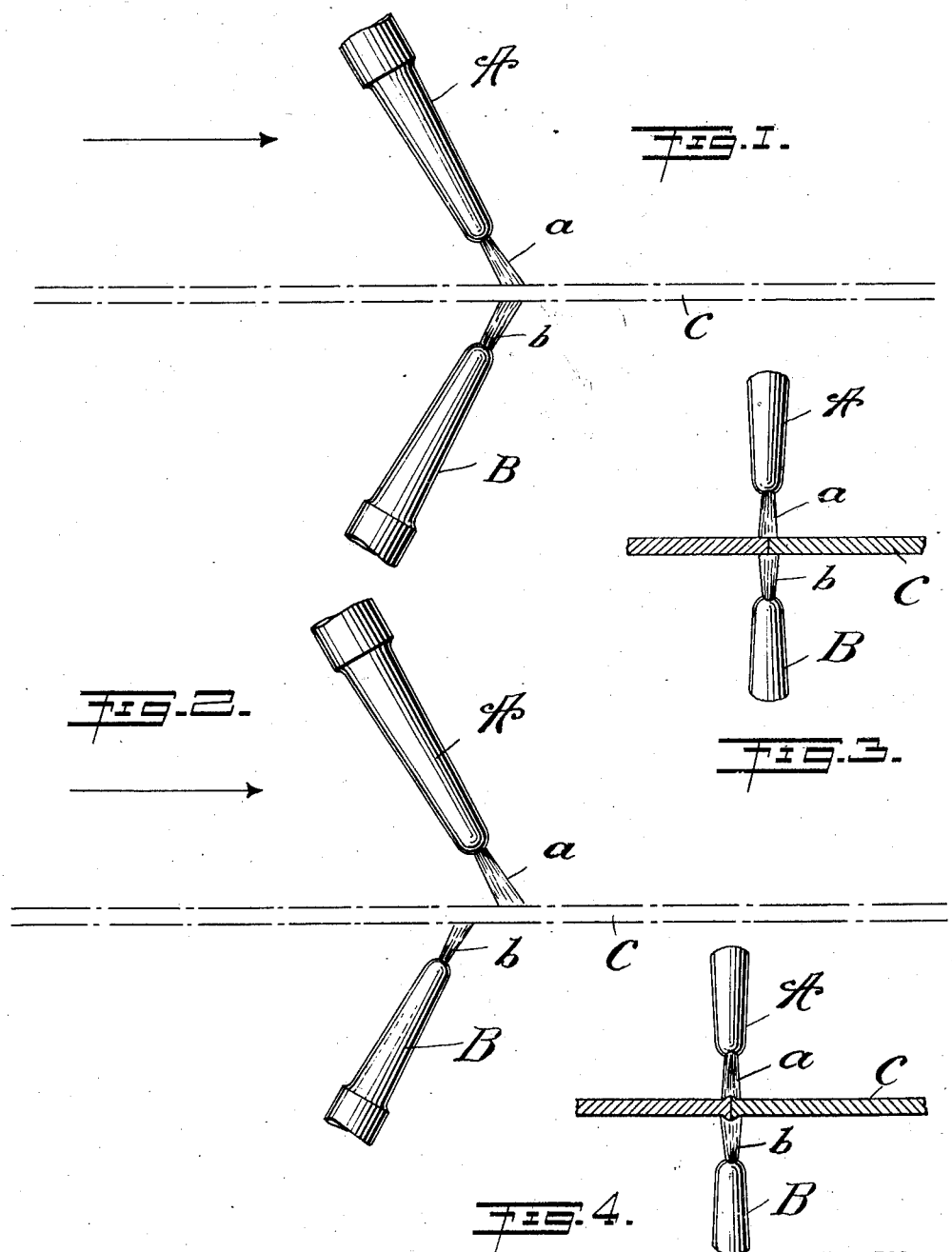

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

WELDING PROCESS.

1,091,479.      Specification of Letters Patent.      Patented Mar. 31, 1914.

Original application filed July 12, 1912, Serial No. 709,079. Divided and this application filed December 10, 1912. Serial No. 735,909.

*To all whom it may concern:*

Be it known that I, WORTHY C. BUCKNAM, a citizen of the United States, and a resident of Marion, Jersey City, in the county of Hudson and State of New Jersey, have invented certain new and useful Improvements in Welding Processes, of which the following is a specification.

This invention relates to the art of autogenous gas welding of metals and more particularly to the production of butt-welded seams in sheet metal.

In autogenous gas welding the union of the pieces or portions of the metal is effected by means of an ignited jet or flame of comparatively small dimensions and consisting of a combustible mixture of gases, such as acetylene and oxygen, or hydrogen and oxygen, the heat of which is sufficiently intense to locally melt and cause the metal to melt and flow together and thus unite of itself, as distinguished from that different art or mode of welding in which the union is effected by hammering or exerting pressure on heated but not melted metal. Hammering is sometimes thought to be desirable in connection with autogenous welding; but it is not for the purpose of uniting the metal, which has already fused together, but for the effect which it is supposed to have on the grain of the metal at the weld. By means of the welding or fusing flame a considerable variety of work can be performed. In the case of heavy pieces or castings or broken parts, which are usually welded by means of a hand torch, the flame is variously maneuvered according to the conditions of the particular piece of work in hand. The flame can be kept moving about over the same general region until the melting is carried to a considerable depth. To facilitate matters the edges of the pieces can be beveled or chamfered so as to afford a groove to enable the flame to get down into the work; and the groove can be filled or the weld strengthened to any desired degree by the addition of molten metal from a rod held in the welding flame.

In the case of sheet metal, the sheets or portions to be welded are placed edge to edge, and the flame is caused to play upon the junction and is moved along it at a speed determined by conditions and the judgment of the operator, the metal of the edges fusing together as the flame progresses. The edges are not customarily chamfered except for comparatively thick sheets, say above one-eighth inch, and metal may or may not be added in the manner just described. Instead of moving the flame along the junction the flame may be kept stationary and the work moved. Consequently when I refer to the flame being moved it will be understood that moving the work in the opposite direction amounts to the same thing. Sheet metal welding may be performed either by hand or by machine. In machine welding both the blow-pipe and the work are solidly supported and one is mechanically driven relatively to the other. The so-called machine welding has the advantage of keeping the blow-pipe at a uniform distance from the surface of the work and of enabling the maximum speed permissible under the circumstances to be maintained throughout the operation. In addition to or in combination with the movement of translation lengthwise of the seam, and more particularly in hand welding, the flame may be given small movements, as forward and backward or in small circles; but the simplest, quickest and most economical way, and the one best adapted to machine welding, is to move the flame forward only, in a continuous and uniform manner, from end to end of the seam. This has proved very satisfactory for the welding of thin sheets or for the more or less superficial welding of thicker sheets but the production of deeper welds requires more time and considerably more gas and in general the results are not as satisfactory as with thinner sheets. My own experience has been that with a flame acting at one side of the work and moved straight ahead along the meeting edges, without chamfering and without the addition of metal, it is difficult to weld clear through sheet metal as much as an eighth of an inch in thickness. In general, the deeper the weld to be effected, the larger the flame must be and the slower the relative movement between the flame and the work. This means that the operation is slower than for a shallower weld and that the consumption of gas for the same length of seam will be very much greater, both because the flame consumes more gas per unit of time and because the time required for the operation is greater. With larger flames, too, more of the heat goes to waste. Furthermore, the deeper the weld the less likely it is to be satisfactory in appearance and in strength. There may be two defects. One is the burning of the metal, due to the comparatively large, intensely hot flame traveling slowly, and the other is the pulling apart of the joint in rear of the flame, due to the contraction of the metal, so that a crack may be observed following up after the flame.

The objects of this invention are to increase the depth of the seam that may be welded, to render the operation quicker, to economize gas, and to secure a better and stronger weld. I accomplish these results by utilizing two welding flames directed upon opposite sides of the work in coöperating relation, and producing continuous relative movement between the work and the flames in the direction of the line of weld, the coöperative relation between the flames being preserved throughout this movement. In this way the seam is welded from both sides simultaneously; but the great improvements secured are not due merely to welding at both sides, but to the remarkable results secured by the coöperation of the flames, which travel along the line of the weld with the work between them and mutually assist each other in welding each successive portion of the seam. The results are the same if the torches are held stationary and the work is moved. By reason of this coöperative action two comparatively small flames at opposite sides of the work can weld a seam in materially less time and with materially less gas than a larger flame at one side would require to effect a weld of the same depth and length. Moreover it is practicable to make deeper welds, and the welds are of a better and stronger character. Best results are secured by spacing the flames somewhat lengthwise of the seam, as in this way the benefits of the coöperative action are secured without danger of melting a hole in the same, so long as the continuous movement is kept up.

In the accompanying drawings diagrammatically illustrating the invention: Figure 1 shows two torch or burner tips directing welding flames upon opposite sides of the work, and indicates by an arrow the direction of movement of the flames relative to the work. Fig. 2 is a similar view showing that the flames need not be of equal size and may be slightly spaced apart, that is to say, one somewhat in rear of the other. They play upon the same general region so as to secure the benefits of coöperation; Fig. 3 is a view at right angles to the preceding views, the work being shown in section; and Fig. 4 is a similar view, showing how the adjoining edges may be slightly upset.

In Fig. 1, A, B represent two torch tips or burners, and C is a diagrammatic representation of the work, which may be two sheets of metal placed edge to edge, though not necessarily in actual contact, or a sheet of metal curved to bring the edges together, for example, the body of a metal barrel. The ignited jets or welding flames issuing from the burners are designated $a$, $b$. They consist of a mixture of a combustible gas of sufficient calorific power and oxygen. One or both of the gases to form each jet is supplied under pressure, the gases are mixed by suitable provisions known in the art, and the jets emerge with considerable velocity, all as well understood. The untreated edges of the work are placed together, as indicated in Fig. 3, or the edges may be slightly upset, as shown in Fig. 4, by way of adding thickness and increasing strength at the weld. The jets preferably impinge upon the work at an inclination. As shown in Fig. 1 they may play upon vertically-opposite points, and the flames may be of the same size and be of equal power, and have the same rate of consumption. With the flames disposed in this manner it will be obvious that the heat at the spot where the flames impinge will be very intense; consequently the speed of relative movement between the flames and the work in the direction of the line of weld can and should be high. In fact it is difficult under these conditions to avoid melting an opening in the seam, and better results can be secured by spacing the flames somewhat, as in Fig. 2, so that one flame is slightly ahead of the other. The distance which may be afforded between them may naturally be varied, say a quarter to half an inch, measured along the line of weld between the points where the two jets impinge. Where the welding flames are spaced it is preferable to have them of unequal size. As indicated, the second flame is smaller than the one which precedes, because the following flame gets more advantage from the preceding flame, than the preceding flame does from the following one. Moreover, using a smaller flame in the rear is a further safeguard against the possibility of melting a hole through the seam.

The flames progress in unison in the direction of the arrow along the line of the weld, or the blow-pipes are held stationary and the work is moved in the opposite direction. In either event the relation between the flames is preserved. Preferably the movement is in a forward direction only, at uniform or substantially uniform speed. The operation proceeds continuously from end to end of the seam.

Whether the flames play upon directly opposite points or upon slightly spaced points, the action is in principle the same. The two flames mutually assist each other in melting the metal, and heat losses by conduction or otherwise are minimized. Moreover, each flame being comparatively small, little heat is wasted in uselessly heating the metal at opposite sides of the seam,—that is to say, the action is more effectually confined to the seam. With two small flames acting at opposite sides of the work, fusing the metal to the desired depth quickly, so that the speed lengthwise of the seam may be comparatively high, danger of burning the metal is practically avoided. Furthermore, since the relative travel lengthwise of the seam is more rapid than when the seam is welded from one side, a greater length of the seam in rear of the flame (assuming that it is the flame which travels) stays hot; and to this I attribute the fact that cracking is practically eliminated by my method. Spacing the flames slightly lengthwise of the seam, as in Fig. 2, also contributes to this result. In other words, the greater the length of seam which is cooling at any one time, the less will be the strain set up, and the less likely the weld is to pull apart. Spacing the flames lengthwise of the seam also possesses the advantage that the metal is not rendered molten all the way through at any one point at the same time, so that perforating is avoided.

Any suitable apparatus may be used for carrying out the process. If the work is stationary, the two blow-pipes, which may be any approved type of oxy-acetylene or oxy-hydrogen welding torch, may be propelled in unison by any suitable means. Preferably the blow-pipes would be solidly supported and mechanically driven, so as to insure uniformity. As in my co-pending application filed July 12, 1912, Serial No. 709,079, of which this case is a division, the blow-pipes may be mounted on a common support or on united supports enabling them to move at opposite sides of the work, a suitable mechanical drive being provided for such support. Or the torches may be solidly supported and stationary, means being provided for moving the work between them. While best results are secured when a mechanical drive is employed, the torches or the work could be moved directly by hand.

The advantages of welding at both sides of the work may be realized to a certain degree by directing a welding flame upon one side of the work and an assisting heating flame upon the other side, and producing relative movement between the flames and work in the direction of the line of weld. The assisting flame may be of the same composition as the main or welding flame but of very much smaller size so as not to weld at the speed at which the torches or the work are driven, or it may be a flame of different composition and of lower calorific power.

What I claim as new is:

1. The method of welding autogenously by means of gases which comprises placing the portions to be united edge to edge, directing autogenous welding flames in coöperative relation upon opposite sides of the work on the line of the weld, and producing continuous relative movement between the welding flames and the work lengthwise of the seam, the work being between the welding flames, and the coöperative relation of the flames being preserved during said movement, so that the seam is welded simultaneously at both sides by virtue of the coöperative action of the flames.

2. The method of welding autogenously by means of gases, which comprises placing the portions to be united edge to edge, causing an autogenous welding flame to play upon one side of the work on the line of the seam, directing an assisting flame upon the opposite side of the work, and producing continuous relative movement between the flames and the work in the direction of the line of weld, the work being between the welding flames, and the coöperative relation of the welding flames being preserved during said movement.

3. The method of autogenously welding seams which comprises placing the portions to be united edge to edge, directing coöperating autogenous welding flames upon opposite sides of the work and in slightly spaced relation lengthwise of the seam, and producing substantially continuous relative movement between the welding flames and the work so that the flames travel along the seam in this relation, the work being between the flames.

4. The method of autogenously welding seams which comprises placing the portions to be united edge to edge, directing unequal coöperating autogenous welding flames upon opposite sides of the work and in slightly spaced relation lengthwise of the seam, and producing substantially continuous relative movement between the welding flames and the work so that the flames travel along the seam in this relation, the work being between the flames.

5. The method of producing autogenously welded seams in sheet metal, which comprises placing the edges of the sheet or sheets contiguous each other, directing autogenous welding flames of unequal size upon said edges at opposite sides of the work, the larger flame being somewhat in advance, and producing continuous relative movement between the flames and the work, so that the flames travel along the seam in this relation, the work being between the flames.

In witness whereof I have signed my name in the presence of two subscribing witnesses.

WORTHY C. BUCKNAM.

Witnesses:
J. F. BRANDENBURG,
E. GREENBERGER.